Jan. 7, 1958    A. B. BOGLE    2,818,967
ELEVATING CONVEYOR
Filed Aug. 17, 1953    3 Sheets-Sheet 1

Inventor
Aubrey B. Bogle
Barthel & Bugbee Attorneys

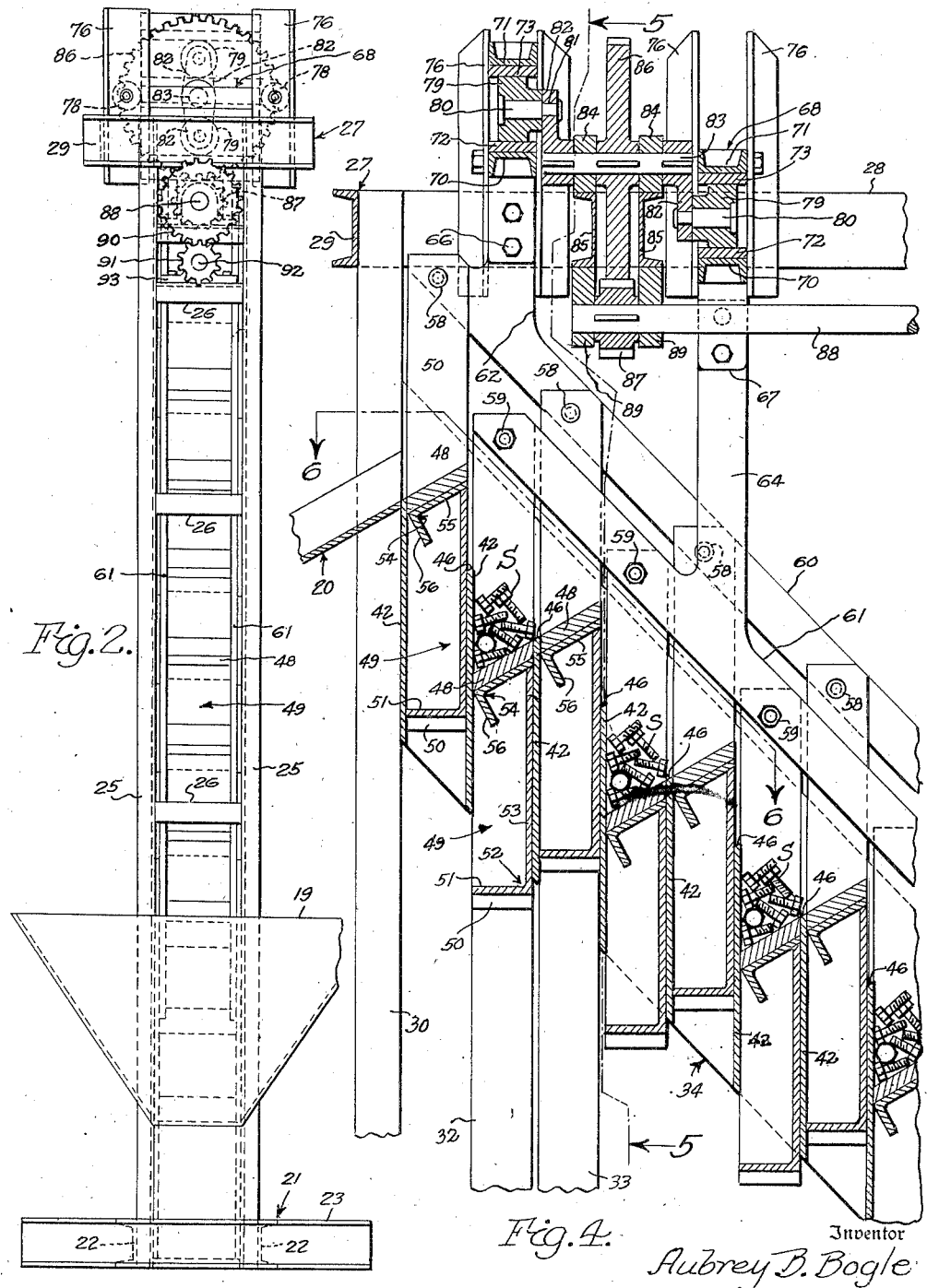

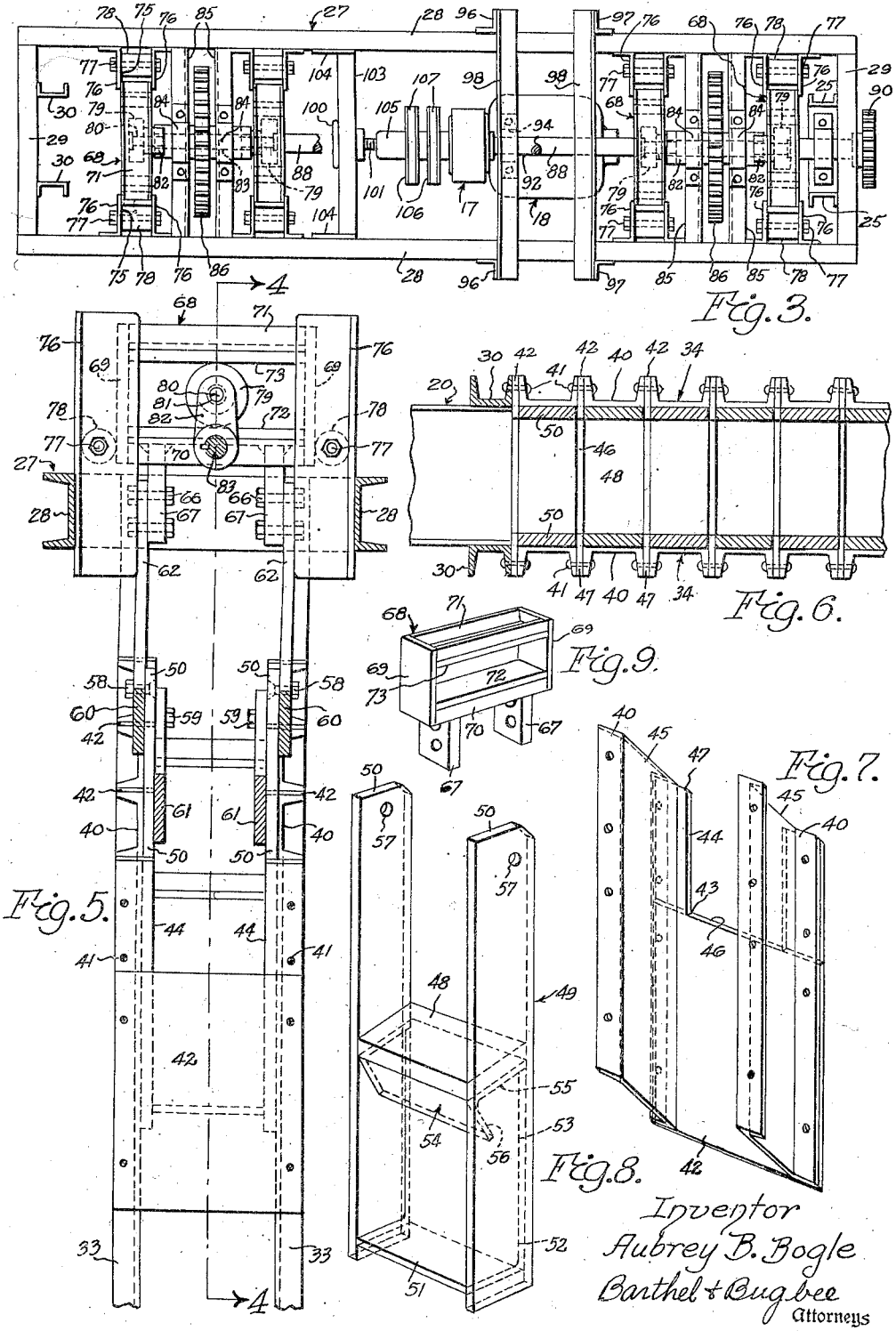

United States Patent Office 2,818,967
Patented Jan. 7, 1958

2,818,967

ELEVATING CONVEYOR

Aubrey B. Bogle, Highland Park, Mich.

Application August 17, 1953, Serial No. 374,740

4 Claims. (Cl. 198—219)

This invention relates to conveyors and, in particular, to elevating conveyors.

One object of this invention is to provide an elevating conveyor which will automatically pick up articles, such as small parts, from a supply receptacle and transfer the articles to a discharge receptacle such as a chute which is at a considerably higher level than the supply receptacle, without requiring any attention on the part of the operator other than seeing that the supply receptacle is always kept supplied with articles.

Another object is to provide an elevating conveyor of the foregoing character which will also automatically meter the quantity of articles elevated, rejecting the excess over a predetermined quantity and delivering this predetermined quantity to the discharge receptacle at each stroke of the conveying mechanism.

Another object is to provide an elevating conveyor of the foregoing character which is double-acting in operation, so that during a complete cycle consisting of an upstroke and a downstroke of each article carrier, the article carrier will pick up and convey two loads of articles, each load being of a definite and predetermined quantity for each load.

Another object is to provide an elevating conveyor of the foregoing character which will pick up and deliver loads of the conveyed articles which are substantially constant in weight, with an error of the order of only about 1% in weight variation.

Another object is to provide an elevating conveyor of the foregoing character wherein the conveyor is provided with two sets of oppositely-reciprocating article carriers arranged in an inclined path and reciprocating upward and downward alternately above and below this inclined path, the article supports or floors of these article carriers being likewise inclined downwardly and forwardly so that at one point in their reciprocation the floors come into alignment in order that the articles on the rearward floor will slide down by gravity onto the forward floor, whereupon the forward floor itself rises and becomes the rearward floor for the next stage of elevation while the former rearward floor descends and becomes the forward floor for the next-preceding article carrier, the articles being transferred in this way from one inclined floor to another by gravity at each reciprocation of the apparatus.

Another object is to provide a metering elevating conveyor of the foregoing character which, although intermittently fed with articles into the supply receptacle, delivers the articles into the discharge receptacle in an even stream and also tumbles the articles as they are being conveyed upward.

Another object is to provide a metering elevating conveyor of the foregoing character which is especially well adapted for use in supplying steel articles to a heat-treating furnace where the hardness of the articles varies if the quantity of articles within the furnace at a given time varies, the present conveyor delivering a substantially constant quantity of articles to the heat-treating furnace or other article-processing apparatus during each unit of time.

Other objects and advantages of the invention will become apparent during the course of the following description of the accompanying drawings, wherein:

Figure 2 is a front elevation of the elevating conveyor shown in Figure 1;

Figure 3 is a top plan view of the elevating conveyor shown in Figures 1 and 2;

Figure 4 is an enlarged fragmentary central vertical section through the upper end of the elevating conveyor of Figures 1 to 3 inclusive, taken along the line 4—4 in Figure 5;

Figure 5 is a cross-section through the upper end of the elevating conveyor of Figures 1 to 4 inclusive, taken along the line 5—5 in Figure 4;

Figure 6 is an inclined section looking downward along the line 6—6 in Figure 4;

Figure 7 is a perspective view of an article carrier guide unit employed in the elevating conveyor of Figures 1 to 5 inclusive;

Figure 8 is a perspective view of one of the article carriers employed with the article carrier guide unit shown in Figure 7; and Figure 9 is a perspective view of one of the cross heads by which a rotary crank motion is converted into a reciprocating motion of each set of article carriers.

Figure 1:
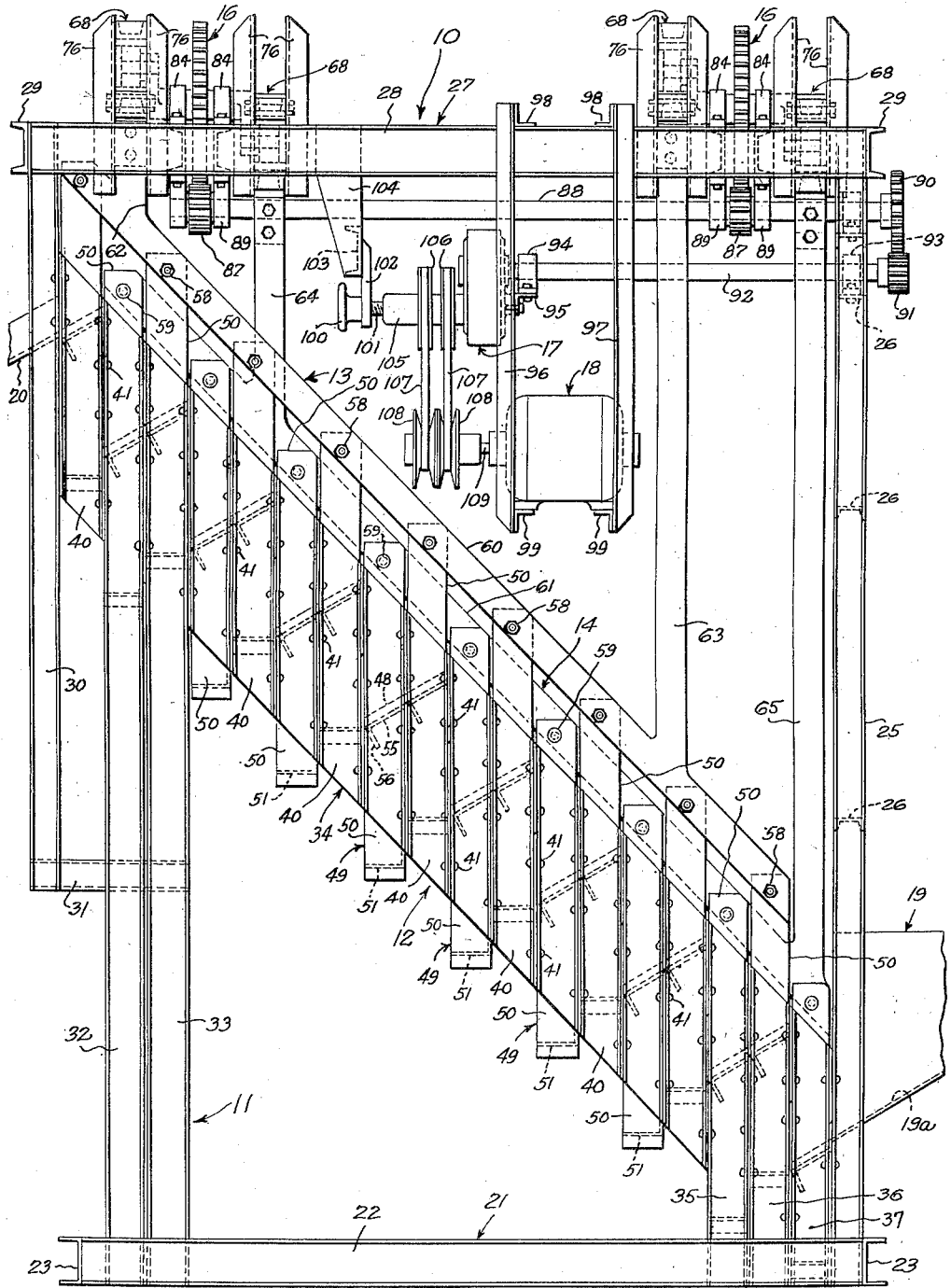
Figure 1 is a side elevation of an elevating conveyor according to one form of the invention, with the uppermost article carrier in the position of having just delivered its load of conveyed articles to a discharge receptacle, such as a chute.

Heretofore, it has been difficult to deliver articles to a processing apparatus, such as a heat-treating furnace, at an even rate and in even quantities, especially where the articles conveyed had to be supplied intermittently to the conveyor. For example, in order to properly heat treat small articles such as bolts or screws to a predetermined hardness, it is necessary that a predetermined quantity or weight of the articles shall be passing through the furnace at a given time. If the quantity varies so that an excessive weight of articles above the desired quantity happens to be in the furnace at a given time, the individual articles will be softer than is desired. If, on the other hand, the quantity of articles in the furnace is less than the predetermined quantity for proper operation for a particular hardness, the hardness will be greater than that desired for the articles.

The elevating conveyor of the present invention automatically picks up and delivers a predetermined quantity of the articles at a substantially smooth and constant rate of delivery, even though the articles are supplied intermittently to a supply receptacle. The articles are conveyed automatically from the receiving level to the discharge level, any excessive number being automatically returned to the next preceding article carrier by merely spilling over from the upper to the lower article carriers by gravity. The elevating conveyor of this invention has been made both single-acting and double-acting, the double-acting form shown in the drawings being preferred because it has a conveying rate which is twice that of a single-acting conveyor. As the articles, such as bolts or screws, slide off the uppermost article carrier at the upper end of the conveying path, their flow becomes evened out as they slide down the discharge receptacle such as a chute onto the receiving conveyor of the heat-treating furnace. The conveyor of this invention has an accuracy which is constant within approximately 1% of a predetermined quantity delivered in unit time, hence the desired hardness is obtained automatically without the need for constant hardness testing which was previously necessary in prior heat-treating operations employing prior conveying apparatus. Moreover, the present elevating conveyor enables the operator to watch the furnace more carefully as well as to supply many times the quantity of articles to the conveyor in a given unit of time than was hitherto possible.

Referring to the drawings in detail, Figures 1 to 5 inclusive show an elevating conveyor, generally designated 10, according to one form of the invention as consisting generally of a framework 11 supporting an elevating conveyor mechanism unit 12 which in turn includes oppositely reciprocating forward and rearward carrier assemblies 13 and 14 respectively moved upward and downward by crank mechanism units 16 driven through a variable speed transmission 17 from an electric motor 18 supported on the framework 11. The articles to be conveyed are received from a supply receptacle 19 with an inclined bottom 19a disposed at the lower level at the rearward end of the machine, whereas the articles, after being conveyed to the higher level at the forward end of the machine are delivered to an inclined discharge receptacle 20 here shown as a chute. The chute 20 may lead, for example, to a conveyor of a heat-treating furnace (not shown) or to any other article processing apparatus, or it may lead merely to packages or packaging apparatus, if the articles are to be packaged immediately without further processing.

The framework 11 consists of a base frame, generally designated 21, of rectangular outline constructed of parallel longitudinal channel members 22 interconnected at their opposite ends by similar cross members 23, the cross members 23 projecting outwardly (Figure 2) beyond the lateral boundaries of the framework 11 in order to give greater stability to the conveyor 10. Rising from the rearward end of the base 21 are two laterally-spaced parallel channel uprights 25 interconnected intermediately by channel cross members 26 and connected at their upper ends to a rectangular top frame 27 consisting of parallel longitudinal channel members 28 interconnected by short parallel channel cross members 29.

Connected to the forward end of the top frame 27 are the upper ends of two laterally-spaced channel uprights 30, the lower ends of which are connected to the forward ends of horizontal channel members 31 which project forwardly from and are connected to two pairs of laterally-spaced channel uprights 32 and 33 respectively (Figure 1). The supply receptacle is secured to and supported by the uprights 25, and the discharge receptacle 20 by the uprights 30. The upper ends of the uprights 32 and 33 are connected to and support the forward upper end of laterally spaced parallel guide structures, generally designated 34, the lower rearward ends of which are connected to and supported by three pairs of parallel adjacent uprights 35, 36 and 37 which at their lower ends are connected to the longitudinal members 22 of the base frame 21. The lower ends of the uprights 32 and 33 are also connected to the longitudinal members 22 of the base frame 21. The upper forward ends of the guide structures 34 are connected to the uprights 30 a short distance below the top frame 27.

The guide structures 34 (Figures 1 and 3) are of approximately trapezoidal shape having vertical upper and lower ends which are disposed obliquely to their inclined upper and lower sides. Each of the two parallel guide structures 34 is built up from short vertical channel members 40 (Figures 6 and 7) with their side flanges bolted or riveted to one another as at 41 with a notched partition plate 42 sandwiched between the flanges of adjacent channel members 40. The plates 42 are provided with notches 43 at their upper ends, the side edges 44 of the notches 43 being spaced slightly inwardly of the webs 45 and the bottom edge 46 being spaced below the top edge 47 of the plate 42 at a level corresponding to the lowest or highest point of reciprocation of the inclined bottom 48 of the article carrier, generally designated 49 (Figure 8), placed on the lower (rearward) or upper (forward) side respectively of a given plate 42 between adjacent channel members 40. The article carriers 49 reciprocate vertically in guideways formed by the webs 45 of the channel members 40 and the plates 42 between them (Figure 6).

Each article carrier 49 consists of a pair of laterally-spaced elongated side plates or bars 50 (Figure 8) interconnected near their lower ends by a cross member 51 forming the lower portion of an angle plate 52 having a vertical portion 53, the upper end of which terminates beneath an angle cross member 54 (Figure 4) having an upper portion 55 inclined at an angle of approximately 30° to the horizontal and a lower portion 56 disposed at right angles thereto. Mounted on top of the inclined portion 55 and similarly inclined to the horizontal is the article carrier bottom 48 previously mentioned. The angle members 52, 54 and the bottoms 48 are secured to the side plates 50 by any suitable means, such as by welding. The side plates 50 are of widths substantially equal to the spaces between adjacent partition plates 42 (Figure 6) with sufficient clearance to permit a free sliding fit therebetween.

The upper ends of the side members 50 of the article carriers 49 are provided with holes 57 adapted to receive bolts or other fasteners 58 or 59 by which they are secured either to the inclined operating bars 60 or 61 respectively (Figures 1 and 4) of the forward and rearward carrier assemblies 13 or 14, alternate article carriers 49 being secured to one or the other of the operating bars 60 and 61. The operating bars 60 and 61 are disposed in pairs parallel to one another, the upper bars 60 of the forward carrier assembly 13 being provided with spaced pairs of upstanding upper and lower connecting rods 62 and 63 and the lower bar 61 with similarly spaced pairs of upstanding upper and lower connecting rods 64 and 65.

The operating bars 60 and 61 of the alternately reciprocating carrier assemblies 13 and 14 are reciprocated by essentially similar crank mechanism units 16 located at the forward and rearward ends of the top frame 27 (Figure 1), hence a description of one such mechanism will suffice for both, and similar reference numerals are therefore employed for corresponding parts in both mechanisms 16.

Each upstanding connecting rod 62, 63, 64 or 65 is bolted as at 66 (Figure 4) to either one of a pair of spaced parallel downwardly extending arms 67 of a cross head, generally designated 68 (Figure 9). Each cross head 68 consists of a pair of spaced parallel side plates 69 interconnected by lower and upper channel cross members 70 and 71 respectively, the arms 67 being secured at their upper ends to the cross member 70. Disposed immediately above the lower cross member 70 and immediately below the upper cross member 71 are spaced parallel bearing plates or wear plates 72 and 73 respectively (Figures 4 and 5). The cross heads 68 reciprocate vertically in guideways 75 (Figure 3) formed by spaced upstanding oppositely facing angle members 76 bolted together as at 77 with rollers 78 between them and in turn secured to the side members 28 of the top frame 27 (Figure 5).

Mounted in engagement with each pair of wear plates 72 and 73 is a roller 79 rotatably mounted on a crank pin 80 which in turn is seated in a hole 81 in the upper end of a crank 82, each crank mechanism 16 containing a pair of these cranks 82 facing in opposite directions at 180° apart (Figure 4) and keyed or splined to the opposite ends of a crank shaft 83. The shaft 83 is journaled in spaced journal bearings 84 which in turn are bolted to spaced parallel channel cross members 85 secured to and extending between the side members 28 of the top frame 27. Keyed or otherwise drivingly secured to the shaft 83 between the journal bearings 84 is a gear 86 which meshes with a pinion 87 keyed or otherwise drivingly secured to a shaft 88. The shaft 88 is journaled in journal bearings 89 bolted or otherwise secured to and depending from the channel members 85, the shaft 88 serving and driving both of the crank mechanism units 16. On its rearward end, the shaft 88 is provided with a gear 90 keyed or otherwise drivingly secured thereto and which in turn meshes with a pinion 91 keyed or otherwise drivingly secured to the rearward end of a shaft 92 (Figure 1) which is journaled in journal bearings 93 and 94 mounted respectively on one of the cross members 26 (Figure 2) and on a cross angle member 95 secured to the forward pair of angle members 96 which, along with a rearward pair of channel members 97 are secured to and depend from the side members 28 of the top frame 27 and are interconnected by angle members 98 and 99 at their upper and lower ends respectively.

Secured to the forward pair of angle members 96 is the variable speed transmission 17. The latter is of a conventional type, the details of which form no part of the present invention, and the shaft 92 is connected to and forms its output shaft. The speed of the variable speed transmission 17 is adjusted by means of a hand wheel 100 mounted on a screw shaft 101 which is journaled in a bracket 102 depending from a channel cross member 103 which in turn is supported between the lower ends of a pair of depending parallel plates 104 secured at their upper ends to the webs of the top frame side members 28 (Figure 1). The variable speed transmission 17 is provided with an input shaft 105 through which the adjusting screw shaft 101 passes and carries a pair of pulleys 106. The latter are drivingly connected by belts 107 to pulleys 108 mounted on the output shaft 109 of the electric motor 18, which in turn is mounted upon and supported by the angle cross members 99. The motor 18 is connected to a conventional energization and control circuit forming no part of the present invention.

In the operation of the invention, a supply of articles to be conveyed, such as the cap screws S (Figure 4) is placed in the supply receptacle 19 and the motor 18 started in rotation. This in turn drives the shaft 92 by way of the belts 107 and variable speed transmission 17, the speed of which is adjusted to the desired amount by rotating the hand wheel 100 and screw shaft 101 in a known and conventional manner. The rotation of the shaft 92 is conveyed to the gears 86 and crank shaft 83 by way of the pinion 91, the gear 90, the shaft 88 and the pinion 89 (Figure 1). The rotation of the crankshaft 83 and with it the oppositely facing cranks 82 causes the crank pins 80 and their rollers 79 to travel through circular orbits, raising and lowering their respective cross heads 68 in timed relationship in such a manner that when the forward cross head 68 is at the upper limit of its stroke, the rearward cross head 68 is at the lower limit of its stroke. Consequently, this motion is transmitted to the forward and rearward carrier assemblies 13 and 14 through their operating bars 60 and 61 and their connecting rods 62, 63, and 64, 65 respectively.

As a consequence, the article carriers 49 connected to the upper operating bar 60 and forming a part of the forward carrier assembly 13 reciprocate upward while the rearward article carriers 49 attached to the rearward operating bar 61 reciprocate downward. Since the bottom 19a of the supply receptacle 19 is inclined downward into alignment with the bottom 48 of the rearmost and lowermost article carrier 49 at its lower limit of reciprocation (Figure 1), the articles contained in the supply receptacle 19 roll or slide downward by gravity into the first article holder 50 (Figure 1) where they come to rest against the partition plate 42 located immediately forward of the first article holder 50, which is located immediately below the connecting rods 65 in Figure 1. The consequent upward reciprocation of the first article carrier 49 attached to the rearward carrier assembly 14 and the simultaneous downward reciprocation of the second article carrier 49 attached to the forward carrier assembly 13, raises the articles S, spilling off the excess articles S, and brings the bottoms 48 of the first two article carriers 49 into alignment, whereupon the articles slide downward from the first bottom 48 to the second bottom 48. Meanwhile, the cranks 82 have rotated through 180° of their 360° cycle of revolution.

As the cranks 82 continue to rotate through the remaining 180° of their cycle of rotation, the article carriers 49 of the rearward article assembly 14 moved downward while the article carriers 49 of the forward article assembly 13 move upward, returning to the relative positions shown in Figures 1 and 4. In this manner, the first, third, fifth, seventh and other odd numbered article carriers 49 constituting the rearward carrier assembly 14 move upward while the second, fourth, sixth, eighth and other even-numbered article carriers 49 of the forward carrier assembly 13 move downward, and vice versa. Thus, each article carrier 49 at its lower limit of reciprocation, namely the bottom of its stroke, receives a load of the conveyed articles and at the upper limit of its reciprocation, namely the top of its stroke, discharges this load into the article carrier 49 located immediately forward of it. In this manner, the articles S are conveyed upward step by step while they are being tumbled, until they are dumped into the discharge receptacle 20 at the upper end of the elevating conveyor mechanism unit 12. Since the bottom 48 of a given article carrier 49 holds only a limited amount of articles S, the excess articles are spilled off as the conveying continues step by step, so that only a predetermined number of articles S is finally discharged into the discharge receptacle 20 at the top of the machine. The weight of this load as determined by the quantity of articles S in each load, has been found to remain constant within approximately 1%, hence the conveyor 10 delivers a steady flow of articles to the discharge receptacle 20 at a substantially constant rate of delivery. Although the loads are delivered to the discharge receptacle 20 intermittently, the flow evens out smoothly into a substantially continuous flow of articles S as the latter roll or slide down the chute or discharge receptacle 20 by gravity. As a result of this operation, a supply of articles S is delivered at a substantially constant rate to the lower end of the discharge receptacle, either for further conveyance to a processing apparatus such as a heat-treating furnace, or to packages or other containers.

It will be evident from Figures 1 and 4 that the elevating conveyor of this invention, although shown as double-acting, may be optionally single-acting if desired merely by disconnecting one of the operating bars 60 or 61 from its reciprocating mechanism 16 and holding it stationary, so that only one set of the article carriers 49 reciprocate, the other set being stationary.

What I claim is:

1. An elevating conveyor comprising an upright frame structure, a succession of multiple substantially vertical parallel guideways disposed in an inclined path in said frame structure, a multiplicity of vertically reciprocable article carriers disposed in said guideways and arranged in said inclined path, said article carriers having forwardly and downwardly directed article supports thereon, said supports being movable into and out of alignment with one another in response to the reciprocation of said carriers in said guideways, a pair of connecting members, each connecting member being operatively attached to alternate article carriers, and reciprocatory mechanism having a pair of oppositely-reciprocating elements operatively connected to said connecting members respectively and adapted to oscillate said connecting members simultaneously in opposite directions and reciprocate the two sets of said carriers connected thereto in said guideways simultaneously in opposite directions.

2. An elevating conveyor comprising an upright frame structure, a succession of multiple substantially vertical parallel guideways disposed in an inclined path in said frame structure, a multiplicity of vertically reciprocable article carriers disposed in said guideways and arranged in said inclined path, said article carriers having forwardly and downwardly directed article supports thereon, said supports being movable into and out of alignment with one another in response to the reciprocation of said carriers in said guideways, a pair of connecting members, each connecting member being operatively attached to alternate article carriers, and reciprocatory mechanism having a pair of oppositely-reciprocating elements operatively connected to said connecting members respectively and adapted to oscillate said connecting members simultaneously in opposite directions and reciprocate the two sets of said carriers connected thereto in said guideways simultaneously in opposite directions, said reciprocatory mechanism including a pair of cranks disposed in oppositely moving relationship.

3. An elevating conveyor comprising an upright frame structure, a succession of multiple substantially vertical parallel guideways disposed in an inclined path in said frame structure, a multiplicity of vertically reciprocable article carriers disposed in said guideways and arranged in two sets in said inclined path, alternate article carriers being operatively interconnected in a first set thereof, the article carriers between said alternate article carriers being operatively interconnected in a second set thereof, said article carriers having forwardly and downwardly directed article supports thereon, said supports being movable into and out of alignment with one another in response to the reciprocation of said carriers in said guideways, partitions stationarily mounted between adjacent article carriers in relatively sliding engagement therewith, and reciprocatory mechanism having oppositely-acting reciprocators operatively connected respectively to said first and second sets of article carriers for opposite reciprocation thereof and adapted to reciprocate said first and second sets of carriers simultaneously in opposite directions in said guideways relatively to said partitions.

4. An elevating conveyor comprising an upright frame structure, a succession of multiple substantially vertical parallel guideways disposed in an inclined path in said frame structure, a multiplicity of vertically reciprocable article carriers disposed in said guideways and arranged in two sets in said inclined path, alternate article carriers being operatively interconnected in a first set thereof, the article carriers between said alternate article carriers being operatively interconnected in a second set thereof, said article carriers having forwardly and downwardly directed article supports thereon, said supports being movable into and out of alignment with one another in response to the reciprocation of said carriers in said guideways, partitions stationarily mounted between adjacent article carriers in relatively sliding engagement therewith and having article overflow edges disposed in alignment with the adjacent pair of article supports at their positions of alignment, and reciprocatory mechanism having oppositely-acting reciprocators operatively connected respectively to said first and second sets of article carriers for opposite reciprocation thereof and adapted to reciprocate said first and second sets of carriers simultaneously in opposite directions in said guideways relatively to said partitions.

References Cited in the file of this patent

UNITED STATES PATENTS

| | | |
|---|---|---|
| 1,696,803 | Kronquist | Dec. 25, 1928 |
| 1,760,369 | Moe | May 27, 1930 |

FOREIGN PATENTS

| | | |
|---|---|---|
| 534,879 | Germany | Oct. 2, 1931 |